United States Patent
Warsinger et al.

(10) Patent No.: US 12,472,468 B2
(45) Date of Patent: Nov. 18, 2025

(54) SALINITY GRADIENT GRADE-SCALE ENERGY STORAGE METHOD AND APPARATUS

(71) Applicants: David Warsinger, West Lafayette, IN (US); Sandra Cordoba, West Lafayette, IN (US); Purdue Research Foundation, West Lafayette, IN (US)

(72) Inventors: David Warsinger, West Lafayette, IN (US); Sandra Cordoba, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 855 days.

(21) Appl. No.: 17/764,528

(22) PCT Filed: Sep. 30, 2020

(86) PCT No.: PCT/US2020/053476
§ 371 (c)(1),
(2) Date: Mar. 28, 2022

(87) PCT Pub. No.: WO2021/067398
PCT Pub. Date: Apr. 8, 2021

(65) Prior Publication Data
US 2022/0339583 A1    Oct. 27, 2022

Related U.S. Application Data

(60) Provisional application No. 62/908,701, filed on Oct. 1, 2019.

(51) Int. Cl.
B01D 61/12 (2006.01)
B01D 61/02 (2006.01)
(Continued)

(52) U.S. Cl.
CPC .......... B01D 61/12 (2013.01); B01D 61/025 (2013.01); B01D 61/06 (2013.01); B01D 61/08 (2013.01);
(Continued)

(58) Field of Classification Search
CPC ...... B01D 61/12; B01D 61/025; B01D 61/06; B01D 61/08; B01D 2313/502;
(Continued)

(56) References Cited

U.S. PATENT DOCUMENTS

| | | | | |
|---|---|---|---|---|
| 6,491,813 | B2 * | 12/2002 | Verde | B01D 61/06 417/313 |
| 9,360,848 | B2 * | 6/2016 | Bonnelye | B01D 61/10 |
| 10,427,101 | B2 * | 10/2019 | Miyakawa | F03B 1/02 |

FOREIGN PATENT DOCUMENTS

| | | | | |
|---|---|---|---|---|
| WO | 2015167333 | | 11/2015 | |
| WO | WO-2015167333 A1 * | | 11/2015 | ............. B01D 61/06 |

(Continued)

*Primary Examiner* — Youngsul Jeong
(74) *Attorney, Agent, or Firm* — David E. Novak; Brannon Sowers & Cracraft PC

(57) ABSTRACT

A method of desalinating water, including the steps of when electricity costs between a first predetermined price and a second predetermined price, fill water is pumped into a reverse osmosis desalination unit to yield desalinated permeate and saltwater having a first salinity, when electricity costs less than the first predetermined price, fill water is pumped into a reverse osmosis desalination unit to yield desalinated permeate and saltwater having a second salinity, and when electricity costs greater than the second predetermined price, pure water is flowed into a reverse osmosis unit to yield pressurized saltwater which is run through a turbine to generate electricity. The first salinity is lower than the second salinity.

19 Claims, 11 Drawing Sheets

(51) Int. Cl.
- *B01D 61/06* (2006.01)
- *B01D 61/08* (2006.01)
- *C02F 1/00* (2023.01)
- *C02F 1/44* (2023.01)
- *C02F 103/08* (2006.01)

(52) U.S. Cl.
CPC .............. *C02F 1/008* (2013.01); *C02F 1/441* (2013.01); *B01D 2311/08* (2013.01); *B01D 2313/083* (2013.01); *B01D 2313/18* (2013.01); *B01D 2313/21* (2013.01); *B01D 2313/243* (2013.01); *B01D 2313/246* (2013.01); *B01D 2313/367* (2022.08); *B01D 2313/502* (2022.08); *B01D 2313/701* (2022.08); *B01D 2317/04* (2013.01); *B01D 2317/06* (2013.01); *C02F 2103/08* (2013.01); *C02F 2201/005* (2013.01); *C02F 2209/006* (2013.01); *C02F 2209/40* (2013.01); *C02F 2301/066* (2013.01); *C02F 2303/10* (2013.01)

(58) Field of Classification Search
CPC .......... B01D 2313/701; B01D 2311/08; B01D 2313/083; B01D 2313/18; B01D 2313/21; B01D 2313/243; B01D 2313/246; B01D 2317/04; B01D 2317/06; C02F 1/008; C02F 1/441; C02F 2103/08; C02F 2201/005; C02F 2209/006; C02F 2209/40; C02F 2301/066; C02F 2303/10; C02F 2313/367

See application file for complete search history.

(56) References Cited

FOREIGN PATENT DOCUMENTS

| WO | 2018136848 | 7/2018 | |
| WO | WO-2018136848 A1 * | 7/2018 | ............. B01D 61/08 |
| WO | 2019051588 | 3/2019 | |
| WO | WO-2019051588 A1 * | 3/2019 | |

* cited by examiner

SALINITY GRADIENT GRADE-SCALE ENERGY STORAGE METHOD AND APPARATUS

CROSS-REFERENCE TO RELATED PATENT APPLICATIONS

This patent application claims priority to U.S. provisional patent application Ser. No. 62/908,701, filed on Oct. 1, 2019.

BACKGROUND

By 2025, 1800 million people are expected to be living in water stressed regions, due to rapid population growth and higher levels of industrialization that exacerbates climate change and extreme weather conditions. In order to meet this growing water demand, it is necessary to improve the capability to use unconventional water sources, such as brackish (low salinity) or seawater. Thanks to the implementation of desalination technologies, this can be achieved. Reverse osmosis (RO) is the most energy-efficient and widespread technology for water desalination, accounting for 60% of the desalination capacity worldwide.

Even though the energy required by RO for seawater desalination has decreased from almost 17 kWh/m$^3$ in 1970 to 2.5 kWh/m$^3$ today, RO's higher specific energy consumption, when compared to traditional water treatment methods, has been one of the main barriers for the expansion of reverse osmosis desalination. Almost 50% of the RO operational expenses are related to its elevated energy requirements, which currently consume more than 200 million kWh per day and generate between 0.4 and 6.7 kg $CO_2$ equivalent for every cubic meter of clean water produced.

Coupling renewable energy (RE) such as solar or wind energy with reverse osmosis has been widely studied as an option to decrease both non-renewable energy use and carbon footprint in reverse osmosis plants. But increased adoption of this combination with renewable energy can result in new challenges for the electric grid. For example, conventional power generation systems can follow a variable load by adjusting the energy supply, whereas renewable power sources are non-schedulable due to their daily and seasonal intermittency. Some factors to consider when including renewable sources in the grid are oversupply risk, energy curtailment, decreased frequency response, and short and steep ramps in energy demand and supply.

Current desalination technologies are not adapted to wide daily electricity availability and the associated price fluctuations, and are especially challenged by the intermittency of renewables in islands such as Hawaii and Puerto Rico, military bases, and distributed electric grid areas throughout the US and globe. This increases desalination prices substantially, builds in cost uncertainty, causes temporary shutdowns, increases reliance on fossil fuels, and limits applicable locations. Thus, there remains a need to desalination that is less sensitive to energy availability and energy price. The present novel technology addresses this need.

DETAILED DESCRIPTION

Figure 1:
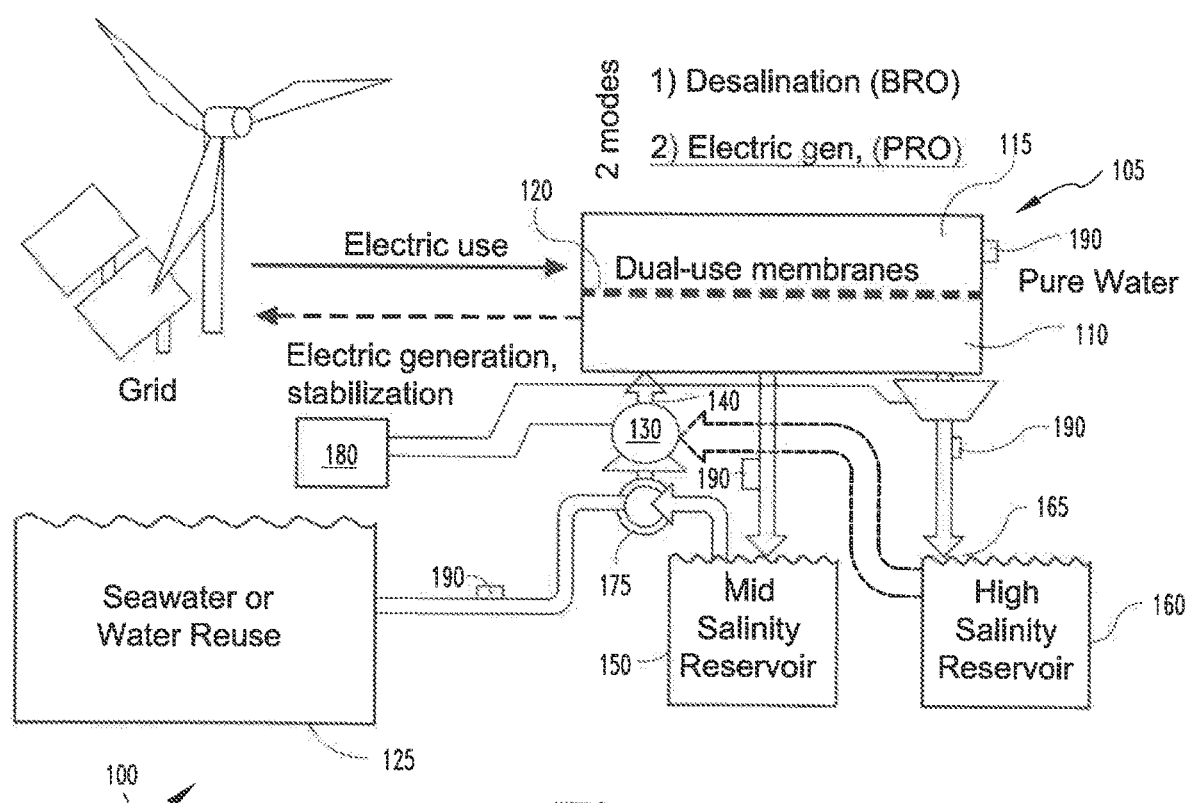
FIG. 1 is a schematic illustration of a desalination system with energy storage and recovery capabilities according to a first embodiment of the present novel technology.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One way of accommodating the introduction of RE to the power grid, without resorting to expensive energy storage technologies, is the use of demand response (DR) strategy, where changes in electric usage by end-use customers from their normal consumption patterns are encouraged to induce lower electricity use at times of high wholesale market prices or when system reliability is jeopardized. Dominant industries, such as aluminum and steel producers, food industry refrigeration, and oxygen manufacturing facilities have already included DR approaches in their operations. In contrast, current desalination technologies, specifically RO, are not adapted to wide daily electricity price fluctuations and are especially challenged by the intermittency of renewables. This non-adaptation to renewables substantially increases desalination prices and reliance on fossil fuels, causes temporary shutdowns, and limits its applicability to certain locations.

RO is difficult to adapt to demand response approaches, as this strategy requires two water sources. In many locations, two different sources are not be readily available. Further, using two water sources promotes water mixing leading to loss of useful work. One approach that has been considered involves different modules of the RO plant being switched on and off as desired to match the RO plant energy consumption to energy availability. Such an approach fulfils the purpose of varying the power demand but leads to an increased capital cost and under-utilization of some elements of the plant. Furthermore, various studies have analyzed the use of hybrid reverse osmosis-pressure retarded osmosis (RO-PRO) systems, where the high salinity brine produced during the RO process is mixed with an impaired water source, like wastewater, in a controlled manner to produce energy with the PRO system. That energy is then used to partially power the RO process, reducing its overall energy consumption. There have been also studies where a RO-PRO hybrid plant is used to produce either water or electricity depending on the electricity cost and availability. Theoretically, this approach can introduce DR capabilities to the RO plant and further reduce its energy consumption by 30% to 50%, but practical considerations such as pump inefficiencies, low power density of the membranes used for PRO, and increased fouling in the support layer of the PRO membranes, are yet to be solved and may hinder its applicability. Therefore, there is still a need to develop new techniques to transform RO plants into facilities capable of applying DR approaches. This would make them compatible with electric grids, with important adoption of RE sources, and without worsening their energy performance or increasing capital or operational costs.

The instant novel technology splits the RO process into two steps. When power is scarce or the electricity is expensive, a plant desalinates feed water at a predetermined recovery ratio (RR) to produce a medium salinity brine. Then when power is cheap, it desalinates the medium salinity brine to produce high salinity brine. This allows the plant to work as a demand response-type system. This approach permits varying the power requirement of the RO plant, resulting in energy savings for the overall process without significant increase in capital costs.

FIGS. 1-11 relate to a method and apparatus for storing energy at the grid scale using a series of reservoirs of different salinity. Energy is stored via reservoirs of different salinities by pairing water reservoirs with new configurations of the desalination technologies reverse osmosis (RO) and pressure retarded osmosis (PRO). This design allows for the simultaneous production of fresh water for cities with varied demand and the storage and production of electricity with the saline brine produced. The energy storage component is similar to pumped hydro but with almost an order of magnitude higher energy density for the same water volume at 100 m elevation, has no constraints on geography/elevation, and creates synergy with existing reservoirs at water treatment plants. Notably, unlike past approaches, this one can avoid turning off desalination capacity, thus causing capital cost advantages.

The instant novel system can dramatically vary its energy needs using the desalination technology discussed herein, allowing a demand/response capability. When power is plentiful and inexpensive, the system may be engaged to desalinate from medium to high salinity; when energy is more expensive and in demand, the system may desalinate from low to medium. Therefore, the chemical potential from differences in salinity acts as the energy storage medium.

The instant novel technology methods and apparati make use of batch reverse osmosis (BRO, the subject of U.S. provisional patent application 62/908,690, incorporated herein by reference) and semi-batch configurations of reverse osmosis (Pulse Flow RO or PFRO), which use unique piping and timing to gain numerous advantages over the prior art desalination techniques. These include reduced membrane fouling and biofouling, increased water recovery, fewer parts, and, potentially, time-varying energy needs and substantial energy gains. Batch refers to concentrating set volumes of water at once, where salinity varies over time. Most energy savings come from using applied pressure to match time varying osmotic pressure. Additionally, the instant novel technology also typically incorporates pressure retarded osmosis (PRO). PRO produces electricity from two water streams of different salinities. In PRO, a brine stream is pressurized and exchanges water with a dilute stream across a membrane (similar to RO membranes). Osmosis increases the volume of the brine stream, and a turbine then extracts work. This allows the process to produce energy from stored brine reservoirs. A commercial system could produce ~400 MWh/day. The design combines with RO to eliminate costs by using RO pump/pressure recover and operating at electricity price points where turning of RO is desirable.

In the instant system, pumps and energy recovery devices (such as turbines), wherein the flow rates of the same are typically precisely controlled to achieve high thermodynamic efficiency. The instant system makes use of this capability of modulating power consumption for providing energy reserve and ancillary services to the power system operator. The system employs salinity differences (analogous to using height difference in a pumped hydro system) as an energy storage mechanism. To provide such services to the grid, the batch reverse osmosis system varies the outgoing salinity of the cycle (and associated applied pumping pressure) depending on the electric demands.

Figure 3:
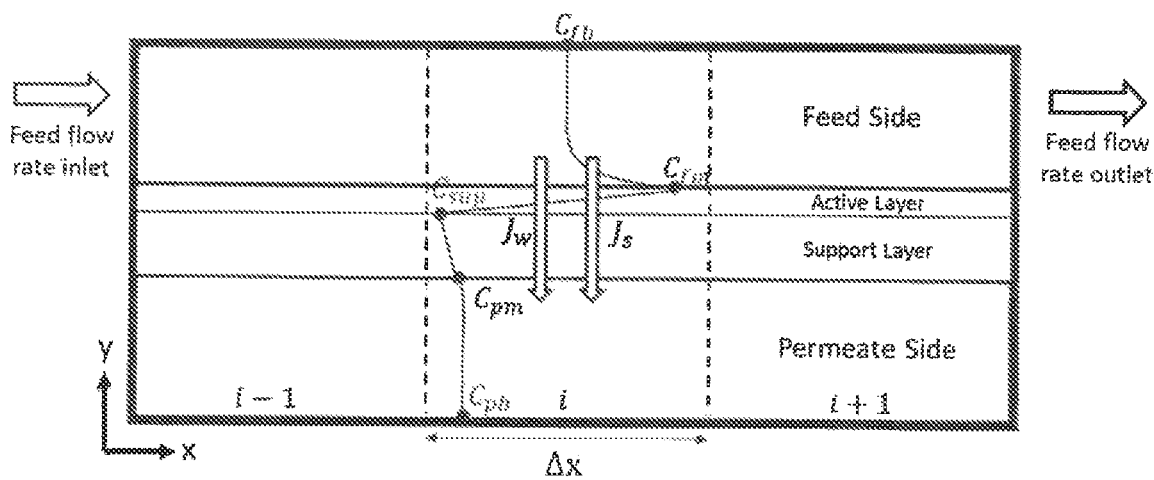
FIG. 3 schematically illustrates the reverse osmosis process occurring in a reverse osmosis module.

A numerical modeling approach is typically used to simulate the split process for controlling different reverse osmosis configurations. The model predicts the water and salt exchange through reverse osmosis membranes, by discretizing the module into several slices, as shown in FIG. 3, and solves the mass conservation and transport equations in each one of them. The implemented computational model calculates the specific energy consumption (SEC) by finding the required applied pressure to produce a given amount of permeate flux for different RO configurations. The model takes into account factors such as concentration polarization and pressure losses within the membranes. The concentration profile calculated near and inside the membrane includes: $C_{fb}$ as the bulk concentration on the feed side of the membrane, $C_{fm}$ as the concentration at the membrane surface on the feed side, $C_{sup}$ as the concentration at the interface between the active layer and the support layer of the membrane, $C_{pm}$ representing the concentration at the membrane surface on the permeate side, and $C_{pb}$ as the bulk concentration on the permeate side of the membrane.

Osmotic Pressure Background

Figure 4:
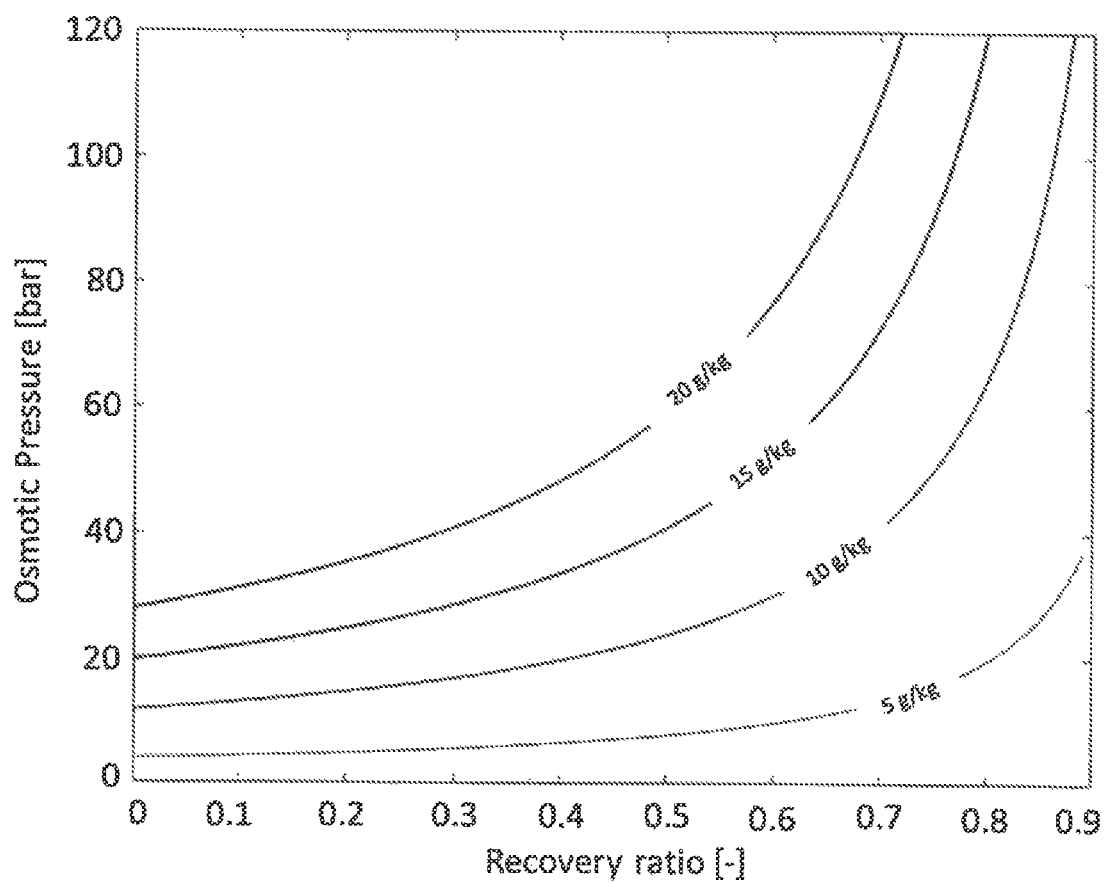
FIG. 4 graphically illustrates osmotic pressure as a function of recovery ratio.

The energy requirement in RO is a strong function of the produced brine salinity, and thus, the recovery ratio (RR). FIG. 4 shows the variation of the osmotic pressure of the produced brine in a RO system with different RR and different inlet feed salinities. As the RR in the system increases, so does the osmotic pressure and the required applied pressure for a given expected permeate flux, leading to an overall increase in power required by the pumps, and ultimately, an increase in the SEC of the RO plant. The package of thermophysical properties of seawater, provided by the MIT, was used to calculate these values. The required applied pressure and, as a consequence, the energy consumption in RO increase with increasing osmotic pressure of the brine leaving the RO membranes. Therefore, a reverse osmosis plant would have the ability to change its power needs during different periods of time by changing the achieved recovery ratio. This can be done by splitting the desalination process into multiple steps.

In equation 1, $J_w$ is the permeate flux, A represents the RO membrane permeability coefficient, and $\Delta P$ and $\Delta \pi$ are the hydraulic and osmotic pressure differences across the RO membrane.

$$J_w = A(\Delta P - \Delta \pi) \quad (1)$$

Hence, by controlling the RR attained by the system, the required power in a RO plant can be modified as necessary to increase or decrease the electric load of the plant to match the conditions of the external electric supply.

System Configuration

Figure 2:
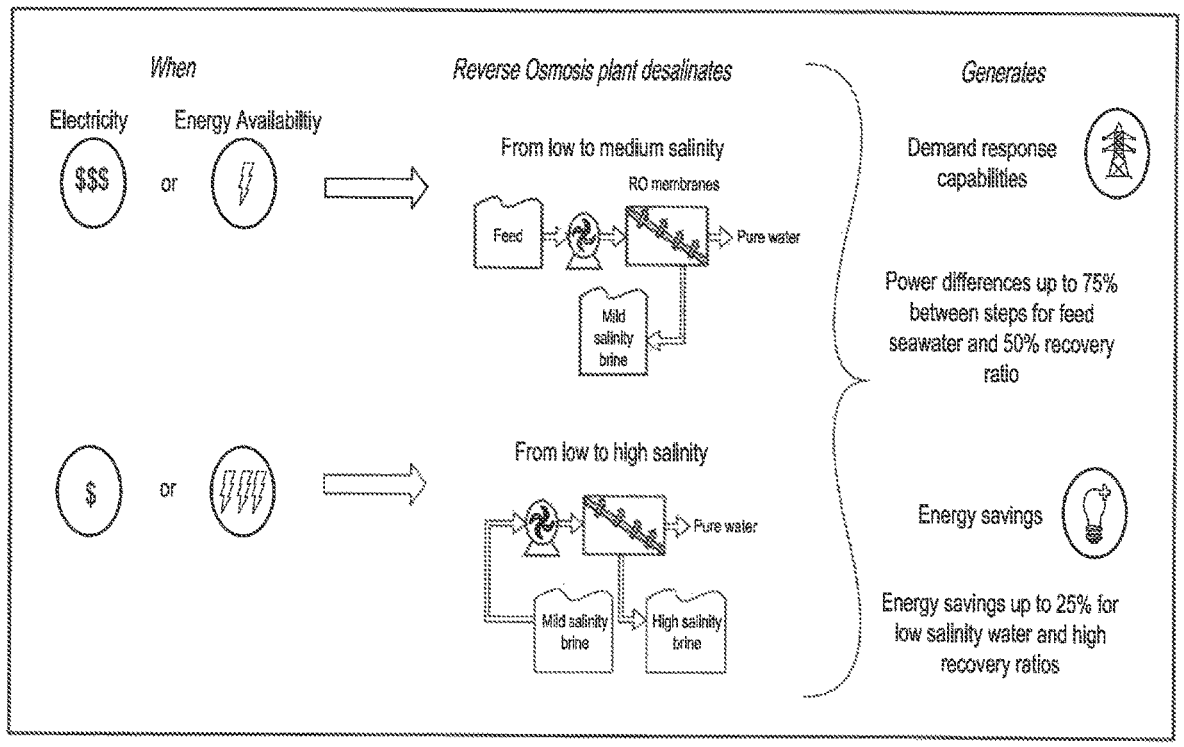
FIG. 2 graphically illustrates the operation of the system of FIG. 1.

A scheme of the proposed demand response-based RO plant is shown in FIG. 2. The desalination process is split in two steps where different recovery ratios are reached according to the availability (or price) of energy supply. When energy is scarce, for example, due to limited production from renewable energy sources or high electricity prices, the plant will reduce its power requirements by desalinating the inlet feed water only up to an intermediate RR. The partially desalinated brine produced during this first step will be stored in a tank that will serve as a reservoir. Later, when the availability of energy increases or the electricity price decreases, the desalination process will be completed by taking the brine produced during the first step and continue the desalination process until the final RR is reached.

Differences in applied pressure between the two steps of the process enable the varied energy demand. To do so, it is worth noting that during the first step permeate flux declines due to the reduced applied pressure. To maintain the overall permeate production in the plant, during the second step, both the feed flow rate and the applied pressure are increased beyond those used during a non-split process to compensate for the reduced permeate production during the first step.

In the split processes, net permeate production is described by the permeate production rate and time spent in each step. This follows from conservation of mass, and is described as $$\dot{V}_{permeate} * t_{total} = \dot{V}_{permeate-1} * t_1 + \dot{V}_{permeate-2} * t_2 \quad (2)$$

where, $\dot{V}_{permeate}$ and $t_{total}$ are, respectively, the permeate flow rate and the total amount of time spent in a non-split process. $\dot{V}_{permeate-1}$ and $\dot{V}_{permeate-2}$ represent the permeate flow rate produced during the first and the second step, and $t_1$ and $t_2$ are the time spent in the first and second step respectively.

Figure 5A:
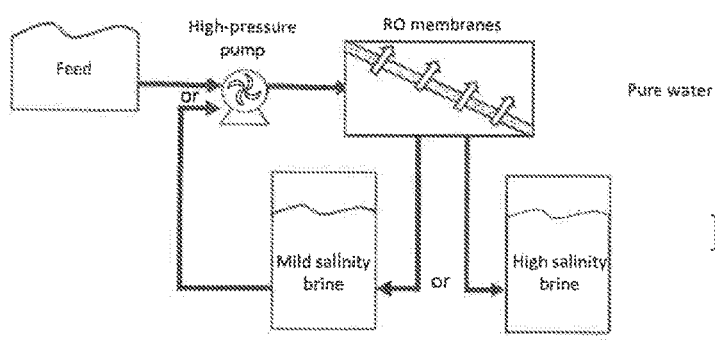
FIG. 5 schematically illustrates the three operating modes of the system of FIG. 1.
Figures 5B, 5C:
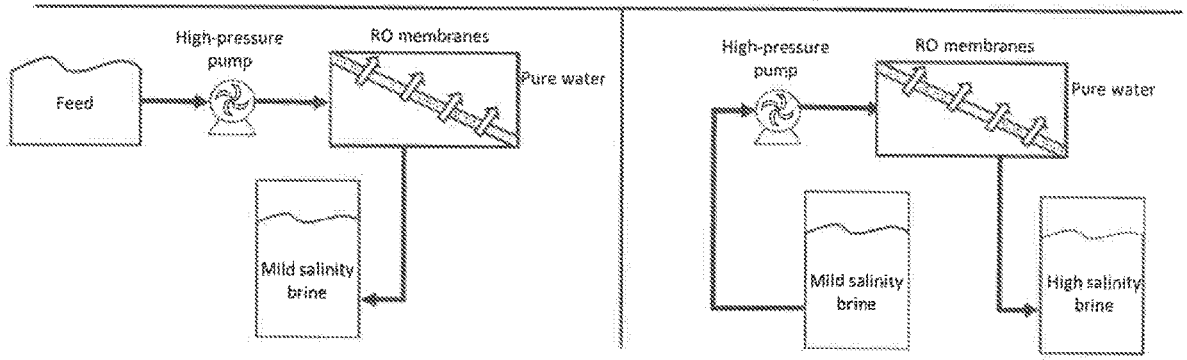

FIG. 5 schematically illustrates a demand response reverse osmosis system, where a mild salinity tank is added to allow for low energy operation. In the low salinity step, when energy is scarce or the electricity price is high, feed water is desalinated only up to an intermediate recovery ratio, and the mild salinity brine produced in kept in a storage tank. In the high salinity step, when energy is readily available or electricity prices decrease, the mild salinity brine stored during the previous step is desalinated until the final recovery ratio is reached.

Because the pressure level and the specific energy consumption in RO depend on the system design and other factors, three different representative RO configurations are presented to cover scenarios of varying power needs for different recovery ratios.

Figure 6A:
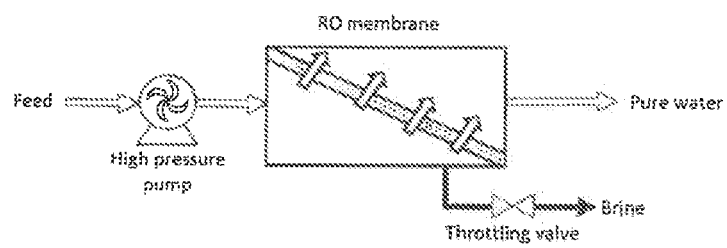
FIG. 6A schematically illustrates the system of FIG. 1 configured for continuous reverse osmosis without energy recovery operation.

Continuous reverse osmosis without energy recovery: The continuous RO configuration is the earliest implementation of the RO technology and has been in use since its inception in the 1970's. RO is a steady state process where a throttling valve is located at the membrane brine outlet to restrict its flow. Throttling builds up pressure within the RO module as shown in FIG. 6A. The power requirements for this configuration can be calculated using equation 3, where $\dot{V}_{feed}$ is the feed flow rate, $P_{applied}$ is the required applied pressure and $\eta_{HP}$ is the efficiency of the high pressure pump.

$$Power_{continuous\ RO} = \frac{\dot{V}_{feed} * P_{applied}}{\eta_{HP}} \quad (3)$$

Figure 6B:
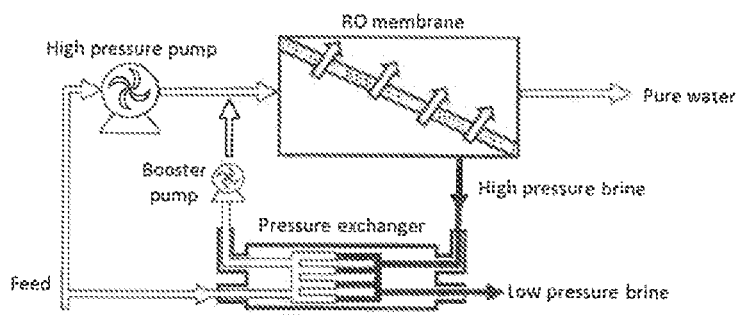
FIG. 6B schematically illustrates the system of FIG. 1 configured for continuous reverse osmosis with energy recovery operation.

Continuous reverse osmosis with energy recovery: Today, virtually all seawater RO plants use energy recovery devices (ERD) to recover energy from the high-pressure brine, that otherwise would be wasted. The most widespread and energy efficient ERD implemented to this date is the pressure exchanger (PX). A pressure exchanger transfers the pressure from the high-pressure brine to the low pressure seawater by bringing the streams into direct contact in the ducts of a ceramic rotor. The RO configuration with a PX is shown in FIG. 6B. The power required when a PX is used can be found using equation 4, where $\dot{V}_{permeate}$ and $\dot{V}_{brine}$ are the permeate and brine flow rates, respectively, $\Delta P_{module}$ represents the frictional pressure losses in the RO membrane, $\eta_{PX}$ is the efficiency of the pressure exchanger and $\eta_b$ is the efficiency of the booster pump.

$$Power_{continuous\ RO+PX} = \frac{\dot{V}_{permeate} * P_{applied}}{\eta_{HP}} + \frac{(P_{applied} - \eta_{PX} * (P_{applied} - \Delta P_{module})) * \dot{V}_{brine}}{\eta_b} \quad (4)$$

Figure 6C:
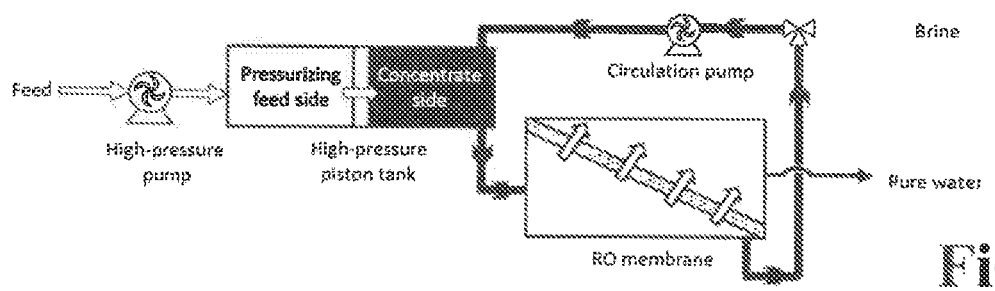
FIG. 6C schematically illustrates the system of FIG. 1 configured for batch reverse osmosis with energy recovery operation.

Batch reverse osmosis: The potentially most efficient reverse osmosis configurations are the novel batch and semi-batch designs. Pressure applied to the feed is varied over time, as the concentration increases, to follow the osmotic pressure of the brine leaving the RO membrane. This pressure control may be achieved by setting small recovery ratios per pass and recirculating the brine back into the module using a circulation pump. It is worth mention that the batch and semi-batch configurations do not require the use of a PX for their operation. One highly efficient batch RO configuration where a double acting cylinder is used to accommodate the pressurized brine is shown in FIG. 6C. The instantaneous power required in the system is the sum of the power consumed by the high pressure pump and the circulation pump, as described in equation 5, where P(t) represents the variable applied pressure over time, $\dot{V}_{brine}$ is the flow rate of brine leaving the RO membrane, $\Delta P_{losses}$ are the frictional losses in the RO membrane and the pipes in the high pressure recirculation loop, and $\eta_{cir}$ is the efficiency of the circulation pump. This can then be integrated over a cycle to calculate the total energy consumption of the process.

$$Power_{Batch\ RO} = \frac{\dot{V}_{permeate} * P(t)}{\eta_{HP}} + \frac{\dot{V}_{brine} * \Delta P_{losses}(t)}{\eta_{cir}} \quad (5)$$

Mechanisms to vary the recovery ratio: The recovery ratio reached by the batch system in each step is fundamentally determined by the operating pressure, as well as fluid dynamic characteristics. The pressure exerted by the pumps is a consequence of the resistance to the flow downstream in the system. In reverse osmosis systems with energy recovery devices, specifically pressure exchangers (PX), a throttling valve is located after the PX as to control the resistance to the flow and as a consequence, the pressure level developed in the system. Therefore, to vary the operating pressure and thus the recovery ratio the following strategies that allow to change the resistance to flow in the system may be employed.

A variable resistance/pressure drop valve may be installed as throttling device. By changing the resistance to flow caused by the valve, the pressure applied by the high-pressure pump will varied as well, changing the reached recovery ratio. Such devices may be components within an energy recovery device.

If the resistance offered by the throttling valve is not modified, an alternative to vary the recovery ratio is changing the flow rate in the high-pressure pump. By introducing a lower amount of feed flow rate to the system volume, that is fixed, the pressure built in the system will decrease. The operational flow rate in the high pressure pump can be changed by using a variable frequency drive (VFD) that will modify the frequency of operation of the motors driving the pump, and as a consequence the flow rate in the system.

Figure 6D:
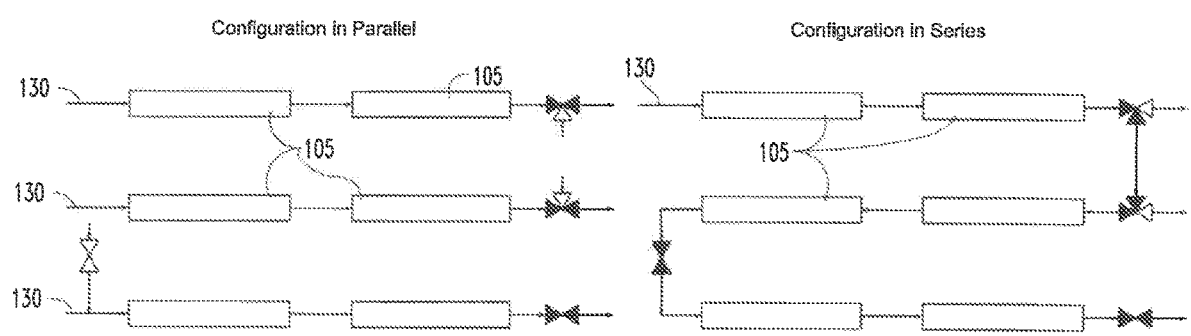
FIG. 6D graphically contrasts reverse osmosis modules connected in parallel with reverse osmosis modules connected in series.

An alternative way to reduce the recovery ratio in the system while maintaining the membrane area is to change the inlet pipe configuration from series to parallel. FIG. 6D shows an example of how this can be achieved using 2-way and 3-way valves and bypass pipes. To reduce the recovery, the flow path length through the membrane module may be reduced. However, ideally no active area is lost in doing so. By putting membrane modules in parallel, the overall recovery through one pass of the system may be reduced. The change in recovery will be roughly proportional to the change in the flow path length, but this may vary depending on pumping pressure and flow rates.

Variable recovery ratio in reverse osmosis may thus be achieved by changing arrangement (parallel and series). In FIG. 6D, there are three pairs in parallel as opposed to six are in series. Direction of arrows indicates flow path. Note that more arrangements are possible with additional bypass valves; in this example there could be two pairs of three in parallel as well, or if mixing losses were acceptable, combinations like two in series and four in series.

Recovery ratio: The recovery ratio reached in the system may be varied using one if a number of alternative approaches. For example, changing the stroke length of the piston, such as by adding an extra intermediate end cap that deactivates part of the piston volume. This internal end cap, which is typically surrounded by liquid on one side and an inactive filler on the other, reduces the piston volume. The end cap could then be moved later to increase the volume. The inactive filler volume is typically filled a liquid which may be added or removed with a pump. Once the desired volume is achieved, a valve may be closed to lock it in place.

Alternately, a bypass channel yielding extra volume to the system may be taken in or out of operation. By using this additional volume, the recovery ratio in the system can be changed while still getting the piston all the way to the end of the cylinder after each cycle and avoiding mixing within cycles. Valves at the entrance and/or exit of this bypass channel will enable or disable it.

The volume of the high-pressure piston tank is sized according to the volume of the pipes and the membrane module in the system, as follows:

$$\frac{V_m + V_{pipes}}{V_t} = \frac{1 - RR}{RR} \quad (6)$$

Where $V_m$ represents the volume of the membrane module, $V_{pipes}$ the volume of the pipes in the high pressure circuit of the system, $V_t$ the volume of the high pressure piston tank and RR is the recovery ratio of the batch RO stage. The high-pressure piston tank has an effective sealing within the piston and is typically cylindrical with four ports that may be taken in and out of operation. A plurality of sensors/gauges are positioned throughout the system, and manifolds are used to accommodate as many electronic devices as possible, while reducing the number of fittings in the system and the pressure drop caused by them.

Intermediate salinity tank-Design and manufacturing: The only additional equipment required in the split-recovery two-step reverse osmosis system is a tank to store the mid-salinity brine produced during the first step of the process. The size of the tank depends on the intermediate recovery ratio ($\dot{R}R_{int}$), the flow of permeate during the first step ($\dot{V}_{permeate-1}$) and the time spent during the first step, $t_1$:

$$V_{tank} = \left[\frac{1 - RR_{int}}{RR_{int}}\right] * \dot{V}_{permeate-1} * t_1 \quad (7)$$

The design and manufacture process of the additional tank typically follows the guidelines described in the API standard 620 for the design and construction of large, welded, low pressure storage tanks. Due to the large storage capacity required by the tank, it typically enjoys a vertical and aboveground design. To avoid the growth of microorganisms in the tanks, several strategies such as mechanical cleaning, surface modification, application of electric current or the use of anti-biofilm polysaccharides can be implemented. To avoid corrosion, the tank can be made of stainless steel 304 or 316, or plastic materials. Also, a different steel type can be used during the manufacturing process if a corrosion inhibitor is applied in the internal surfaces of the tank. The tank itself may also be a water reservoir, dug into the ground and adequately lined. Because of the pretreatment costs, this water is ideally well-sealed from the environment, or internal microbial contamination. Reservoirs would therefor require a surface protection, which could be a free-standing structure, or a floating structure or fabric. A plant seeking diverse demand response capabilities may benefit from numerous salinity tanks available. Such a need could be addressed by dividing up a tank with flexible spacers that divide out water by salinity. Because of the high-pressure water exerts when displaced at different heights, less costly embodiments may use movable dividers in such a tank, that could be solid materials like metals, or could be fabric that encloses the liquid.

Optimization strategy to do salinity switching during operation: The selection of the moment or time of the day when the salinity switching is done is a helpful factor to the operation of the split-recovery reverse osmosis system so as to save energy and operational costs. If the salinity switching is done according to the price of the electricity, the preferred demand response schemes to work with are the price based programs such as time of use, where electricity has high prices during peak hours and low prices during off-peak hours. The system will work desalinated water up to the intermediate salinity during peak hours and the final recovery ratio will be reached during off-peak hours. When the salinity switching is done considering the availability of power from an intermittent source, a lower limit for power level will be stablish according to the system size and operating conditions, if the available power falls below that power level, the system will work under low energy conditions by desalinating up to an intermediate level. Conversely, if the available power is above that lower limit, the system will desalinate from the intermediate salinity up to the final recovery ratio.

FIG. 5 shows the SEC for the three modeled configurations for different recovery ratios, using feed seawater with a concentration of 35 g/kg and an average permeate flux of 15 LMH, which are typical values in RO plants. While the SEC for steady state processes vary significantly with RR, the SEC for the batch RO configuration does not change substantially when higher recovery ratios are reached, limiting the possibilities of batch RO systems to be used in a demand response fashion by splitting the process.

The steady state RO configurations offer good potential for functioning under a demand/response paradigm, as there is a significant variation in the specific energy consumption for different recovery ratios. The efficiency of the high-pressure pump is taken as 0.8 and for the circulation and booster pumps the efficiency is taken as 0.65. As shown in FIGS. 6A-6C, splitting standard steady state RO processes has great potential to achieve demand response capabilities in desalination. However, implications on the overall energy consumption must be carefully considered. The improvement is unsurprising since the approach is very similar to that of a two-stage RO process, which are known to exhibit relatively efficient performance. However, for the splitting process, only part of this benefit is available, and under limited conditions.

Two-stage RO processes reduce energy requirements by reducing the excess applied pressure for the initial low salinity stage. These processes directly send the pressurized brine of the first stage to a pump for further pressurization in the second stage. However, in the instant 2-step process, the brine produced during the first step is depressurized and stored in a tank to be used as feed for the second step. The energy recovery devices for said depressurization are not 100% efficient (usually 90-96%), which accounts for losses as compared to a traditional 2-step process. While the energy improvements here are not as high as 2-stage processes, splitting in this manner requires only the same components as a single stage process plus an inexpensive tank.

Figure 7:
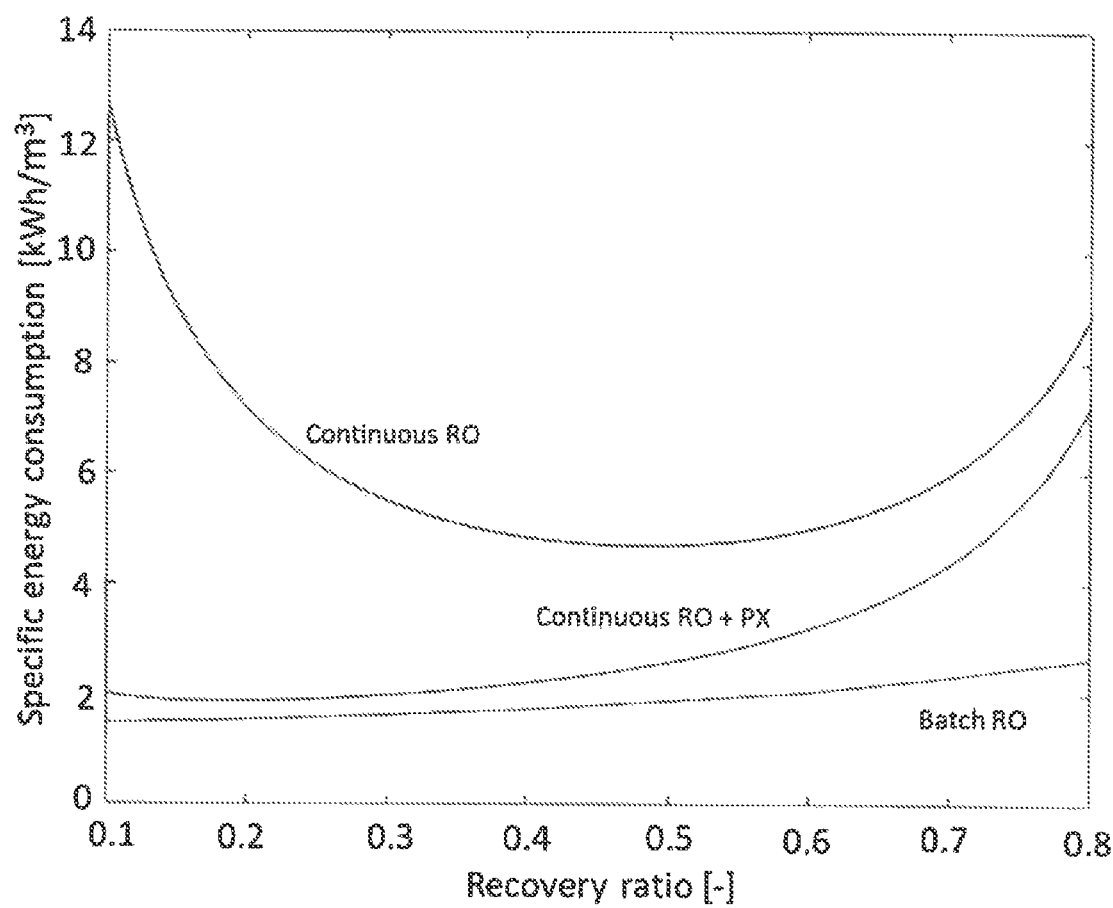
FIG. 7 graphically illustrates specific energy consumption as a function of recovery ratio.
Figure 8:
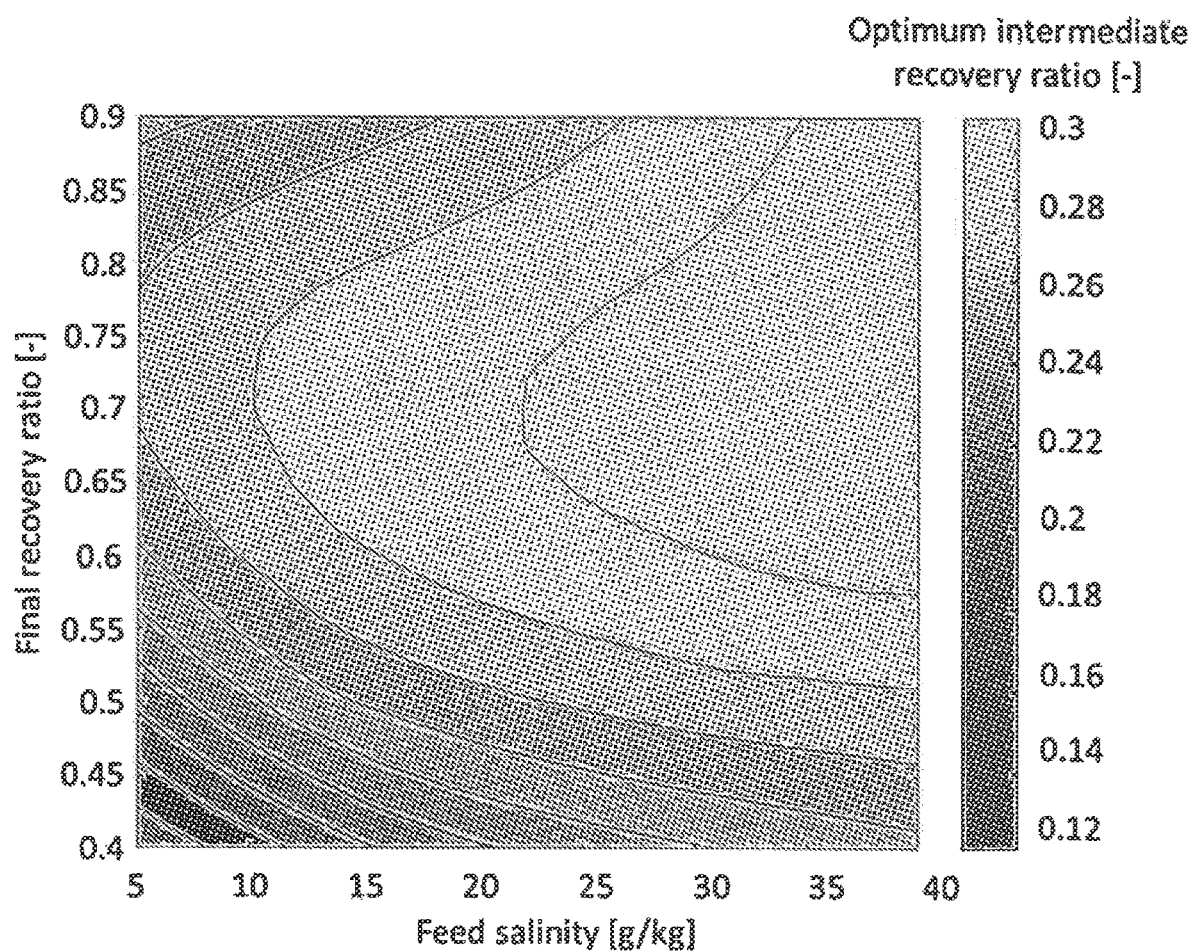
FIG. 8 graphically illustrates final recovery ratio as a function of feed salinity.

The effects of the implementation of the proposed 2-step process on the overall SEC were analyzed for the continuous RO configurations with and without energy recovery. The SEC for the 2-step continuous RO process without energy recovery was found to be always higher than the SEC of its non-split counterpart. This consistent performance degradation for this older configuration occurs because the brine pressurization energy in the first stage is wasted. In contrast, the overall SEC for a 2-step continuous RO process with energy recovery can be improved. Efficiency improvement was found to be dependent on the intermediate RR selected during the first step, with some cases being lower than the SEC of a non-split RO process. The energy difference is significant and impacts cost, so split-process design is typically chosen around an optimum intermediate RR. FIG. 7 shows the intermediate RR that would produce the lowest overall SEC in a continuous 2-steps RO process with an energy recovery device (PX) for different inlet feed salinities and final RR to be reached, when the two steps have the same duration. FIG. 8 is a contour map of the optimum intermediate recovery ratio to minimize the specific energy consumption, calculated for continuous RO with a pressure exchanger, split into two steps, and graphed as a function of feed salinity and the final recovery ratio.

Figure 9:
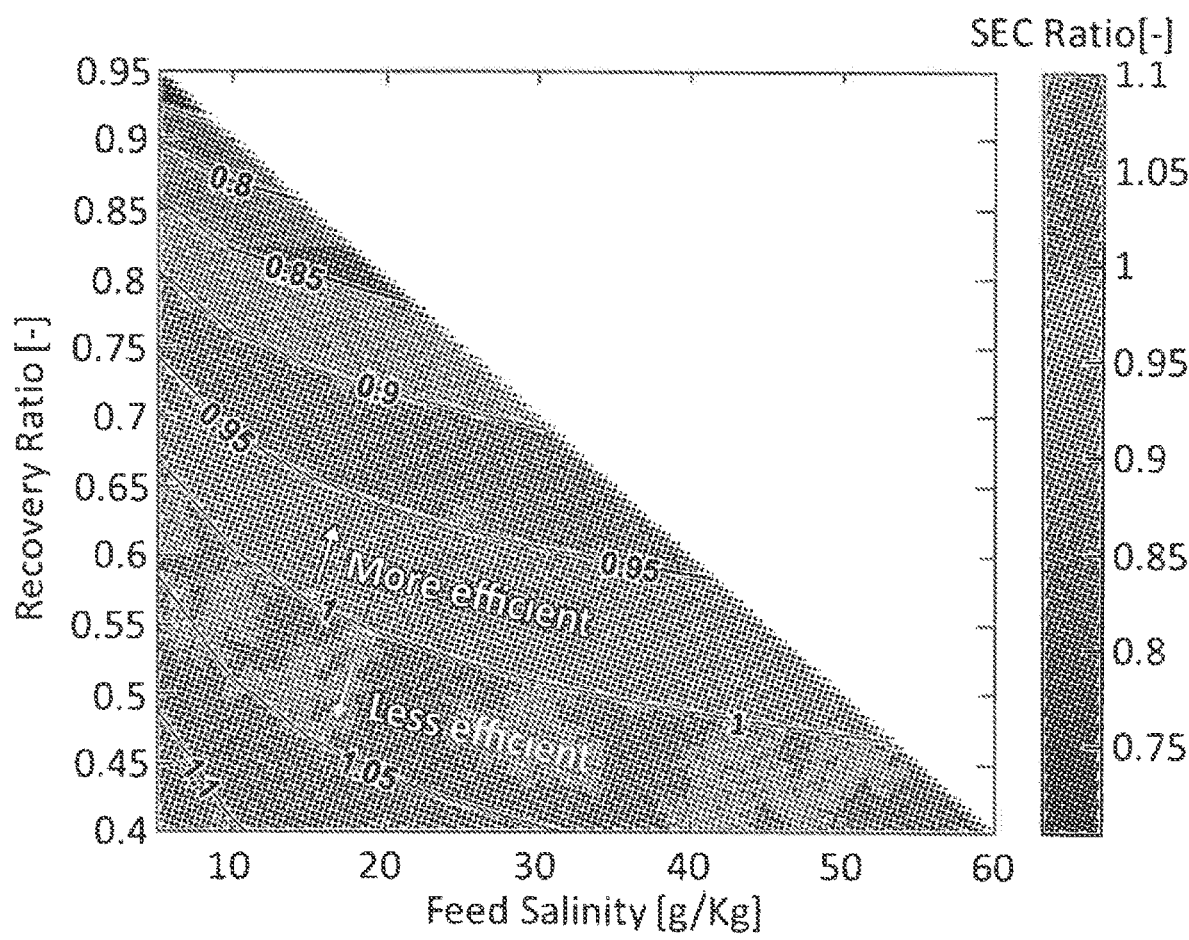
FIG. 9 graphically illustrates recovery ratio as a function of feed salinity.

The effects on the overall SEC when the split-salinity demand response approach is used along with the optimum intermediate recovery ratios shown in FIG. 9. The ratio between the overall SEC during a 2-step split process and its non-split counterpart are shown for the same feed salinities and final RR as FIG. 8. Values lower than 1 indicate that the energy used in the 2-step process is lower that the energy consumption in a non-split process, whereas undesirable values higher that 1 show where the split process uses more energy to produce the same amount of permeate. Energy savings of up to 25% are possible when working with brackish water and high recovery ratios.

The effectiveness of a demand response approach can be measured by its ability to generate significant power consumption differences between periods of low and high energy availability, and its capacity to sustain those differences over a given period of time. These two factors ultimately determine the energy difference that can be achieved during an event of reduced energy supply. This energy difference between steps is a function of the initial feed salinity, the recovery ratio, and the water production capacity of the plant, shown in the previous figures. In order to split the process and generate those energy differences, a tank with enough capacity to store the mild salinity brine produced during the first step is required.

Figure 10:
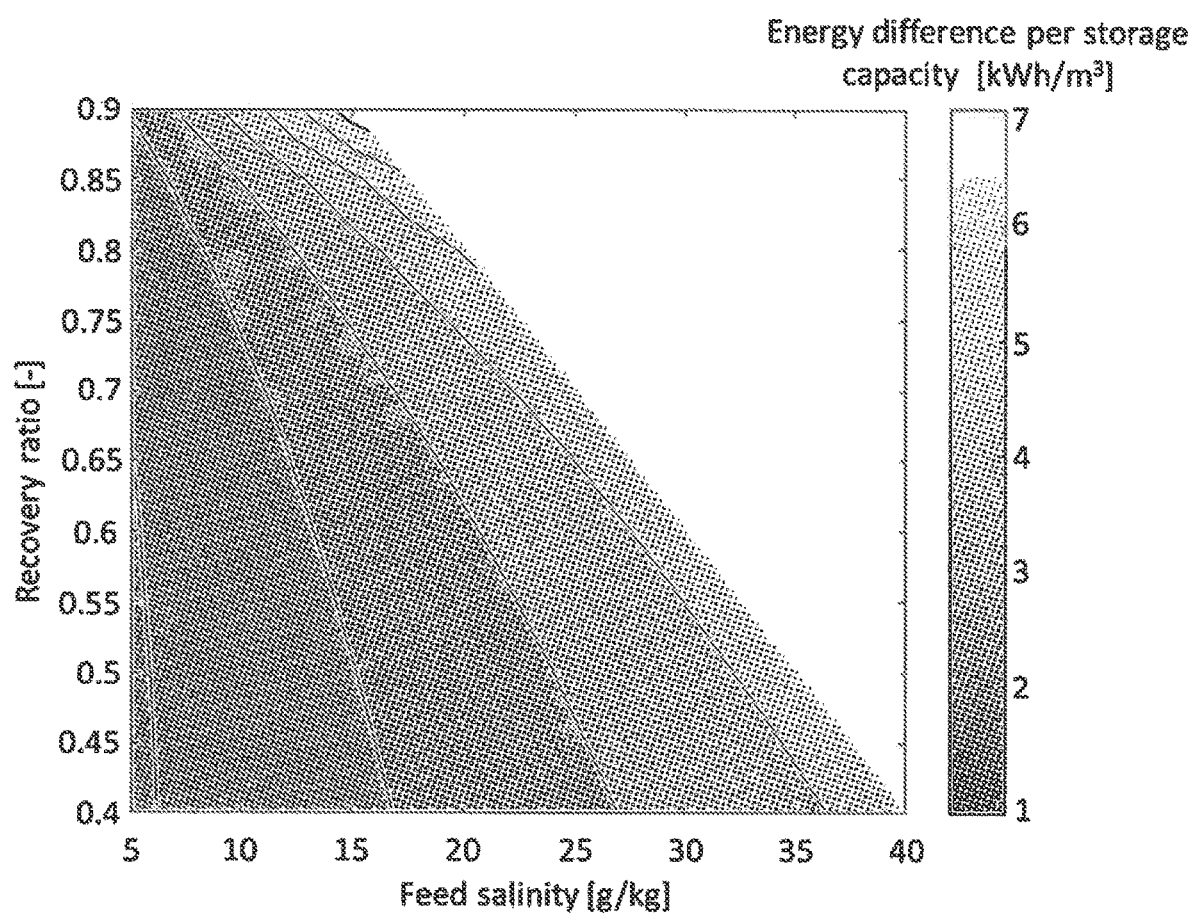
FIG. 10 graphically illustrates recovery ratio as a function of feed salinity.

The energy differences achievable in a 2-step split RO process can be mapped as a function of the inlet feed salinity and the recovery ratio. Normalizing this energy difference map by storage capacity gives an effective energy density provided by the storage volume (see FIG. 10). This ability to create energy differences between steps increases at higher recovery ratios and higher feed salinities. This energy difference between the first and second half of the split RO process enables effective demand response. Demand response capabilities improve at higher salinities and recoveries. FIG. 10 displays a function of the final recovery ratio and the inlet feed salinity, wherein blank regions in the figure indicate brine salinity over 70 g/kg. For a conceptual analogy, this "energy difference per storage" is seen in hydropower dams doing demand response, where a height of 1093 m would achieve a value of 3 kWh/m$^3$.

Figure 11:
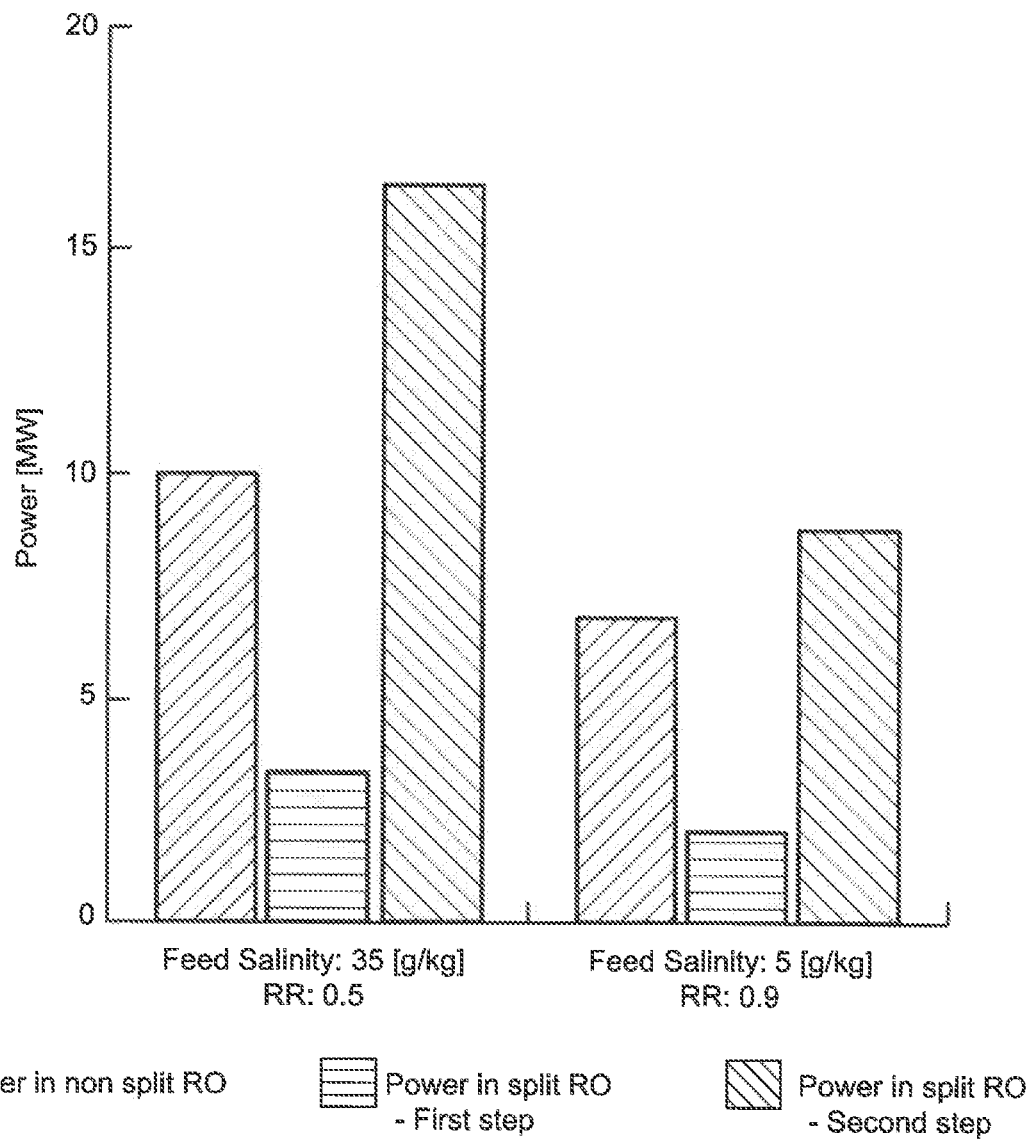
FIG. 11 graphically illustrates power as a function of feed salinity.

One of the main goals when splitting the RO process into two steps is creating substantial power requirement differences between the steps in order to match variable power supply. FIG. 11 shows the power requirements of a desalinization plant when the process is not split, and the power requirements for each step of the split process. Significant power variations can be achieved by splitting the process without any need for additional equipment except the storage tank/reservoir to collect the brine produced during the first step and without negatively affecting the SEC. During the second step, the pressure and feed flow rate are increased to compensate for the reduced permeate production during the first step, as described in equation 2. This can be achieved by using a variable frequency drive (VFD) to modify the speed in the high-pressure pump.

FIG. 11 shows power requirements of a reverse osmosis plant with pressure exchangers and a capacity of 100,000 m$^3$/day, for a non-split process and for the different steps of a split process, for different inlet feed salinities and recovery ratios. The second step has high power requirements because in the second step, the feed flow rate and the pressure level are raised to increase the permeate production and compensate for the reduced water flux produced during the first step. Here power differences of 13 MW between steps one and two of the split process are obtained with seawater (35 g/kg salinity) as feed and RR of 50%, and 6.6 MW for brackish water with 5 g/kg as feed and RR of 90%. It is worth noticing that, as shown in equations 3, 4 and 5, the power requirement for the RO plant is heavily influenced by the efficiencies of the pumps involved in the process. In most studies, the efficiency values are taken as constant but they are a function of the pressure and flow rate of the pump. Such changes in the efficiency for different working conditions should be taken into account when the SEC is calculated.

To recap, the split-salinity demand response RO process discussed above is a robust approach to grant demand/response capabilities to reverse osmosis plants to improve overall efficiency and can be readily adapted to existing plants. Splitting reverse osmosis systems in steps that run at different times enables their integration with renewable or temporally varying energy sources, without significant increase in the capital cost of the desalination facility or the introduction of expensive energy storage mechanisms. Batch or transient reverse osmosis configurations do not have a good potential to provide demand response energy changes by splitting the process in multiple steps, as their energy consumption does not vary significantly with recovery ratio. The implementation of continuous reverse osmosis configurations enables the introduction of demand response capabilities by splitting the process into 2 steps; however, there are also important implications on the overall energy consumption. If no energy recovery devices are used, it is likely that the implementation of splitting the process would result in an increase in the total energy consumption. When pressure exchangers are used, the overall energy consumption in the system can be decreased when the intermediate recovery ratio is properly chosen. During the first step of the process, the permeate flux is low as the applied pressure is the system is reduced. To compensate for this and maintain the overall production capacity, the pressure and flow rate in the second step is typically increased accordingly, higher than the values used in a non-split scenario.

Electronics and control: There is an electronic controller receiving the information read by the sensors and operating the valves and pumps in the systems. The system uses a collection of sensors to control the process as follows. Flow rate sensors: Used to measure high pressure pump flow rate, permeate flow rate and brine flow rate. Flow rate sensors are used to send a signal to the main controller to monitor and control the permeate flux. As the high pressure pump flow rate corresponds with the permeate flow rate, by increasing or decreasing the high pressure pump flow rate the permeate flux can be adjusted. Several types of flow rate sensors may be used in the system. Ultrasonic Doppler Flow meter: This type of sensor is recommended to be used in the feed and brine path because it is not in direct contact with the high pressure fluid. Also, this type of sensor requires no pipe modifications to be installed. Paddle Wheel Flow meter: As the turbine located within the sensor will be in close contact with the fluid, this type of sensor is recommended to be used in the permeate path. Pressure sensors: Required to measure pressure after the high pressure pump and in the high pressure close loop. The pressure sensor should be heavy duty, able to withstand high pressures, and able to work with a variety of fluids. Conductivity sensors: Used to measure the concentration of minerals in the feed fluid and the permeate. As the conductivity depends on the amount of minerals in the solution, this measurement can be then transformed into salinity levels. This sensor helps determine the current concentration at parts of the system, allowing for the optimizing the splitting of the water recovery.

EXAMPLE

A desalinization system 100 of the present novel technology includes a first chamber 105 having a first portion 110 for holding fill water, a second portion 115 for holding desalinated permeate water, and a reverse osmosis membrane 120 positioned therebetween. The system 100 includes a fill reservoir 125 of water to be desalinated, a pump 130 having an inlet 135 connected in fluidic communication with the reservoir 125 of water to be desalinated and an outlet 140 connected in fluidic communication with the first portion 110, a first reservoir 150 for containing water of a first salinity level connected in fluidic communication with the inlet 135 and connected in fluidic communication with the first portion 110, an energy recovery device 155 connected in fluidic communication with the first portion 110, a second reservoir 160 for containing water of a second salinity level connected in fluidic communication with the energy recovery device 155 and connected in fluidic communication with the pump inlet 135, and a port 165 operationally connected to the second portion. The salinity level of the first reservoir 150 is greater than the fill reservoir 125 and less than the second reservoir 160. Water may be pumped from the fill reservoir 125 into the first portion 110 for reverse osmosis to fill the second portion 115 with permeate and wherein the first portion 110 may be emptied into the first reservoir 150. Water may be pumped from the first reservoir 150 into the first portion 110 for reverse osmosis to fill the second portion 115 with permeate and wherein the first portion 110 may be emptied through the energy recovery device 155 into the second reservoir 160. Water may be pumped from the second reservoir 160 into the first portion 110 and wherein permeate may be pumped into the second portion 115 to force water through the energy recovery device 155 into the second reservoir 115 to generate electricity.

A valve assembly 175 is typically connected in fluidic communication with the first reservoir 150, the second reservoir 160, and the inlet 135. An electronic controller 180 is typically operationally connected to the pump 130 and the valve assembly 175, and a plurality of sensors 190 are typically positioned to measure pump flow rate, permeate flow rate, brine flow rate, wherein the respective sensors 190 are connected in electric communication with the electronic controller 180. The electronic controller 180 is programmed to pump water from the fill reservoir 125 into the first portion 110 for reverse osmosis to fill the second portion with permeate empty the first portion 110 into the first reservoir 150 when electricity is between the first and a second cost, wherein the electronic controller 180 is programmed to pump water from the first reservoir 150 into the first portion 110 for reverse osmosis to fill the second portion 115 with permeate and wherein the first portion 110 may be emptied through the energy recovery device 155 into the second reservoir 160 when electricity is below the first threshold cost; and wherein the electronic controller 180 is programmed to pump water from the second reservoir 160 into the first portion 110 and pump permeate into the second portion 115 to force water through the energy recovery device 155 to generate electricity for the grid when electricity is above the second threshold cost.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A desalinization system comprising:
   at least one membrane module, wherein each respective membrane module defines a first chamber having a first portion for holding fill water, a second portion for holding desalinated permeate water, and a reverse osmosis membrane positioned therebetween;
   a fill reservoir of water to be desalinated;
   a pump having an inlet connected in fluidic communication with the fill reservoir of water to be desalinated and an outlet connected in fluidic communication with the first portion;
   a first reservoir for containing water of a first salinity level connected in fluidic communication with the inlet of the pump and connected in fluidic communication with the first portion;
   an energy recovery device connected in fluidic communication with the first portion;
   a second reservoir for containing water of a second salinity level connected in fluidic communication with the energy recovery device and connected in fluidic communication with the inlet of the pump; and
   a port operationally connected to the second portion;
   wherein the salinity level of the water in the first reservoir is greater than the salinity level of the water in the fill reservoir and less than the salinity level of the water in the second reservoir;
   wherein water is pumped from the fill reservoir into the first portion for reverse osmosis to fill the second portion with permeate and wherein the first portion is emptied into the first reservoir;
   wherein water is pumped from the first reservoir into the first portion for reverse osmosis to fill the second portion with permeate and wherein the first portion is emptied through a turbine into the second reservoir; and
   wherein water is pumped from the second reservoir into the first portion and wherein permeate is pumped into the second portion to force water through the energy recovery device into the second reservoir to generate electricity.

2. The system of claim 1, further comprising a valve assembly connected in fluidic communication with the first reservoir, the second reservoir, and the inlet of the pump, an electronic controller operationally connected to the pump and the valve assembly, and a plurality of sensors positioned to measure pump flow rate, permeate flow rate, brine flow rate, wherein the respective sensors are connected in electric communication with the electronic controller.

3. The system of claim 2, wherein the electronic controller is programmed to pump water from the fill reservoir into the first portion for reverse osmosis to fill the second portion with permeate and to empty the first portion into the first reservoir when electricity is between a first threshold cost and a second threshold cost, wherein the electronic controller is programmed to pump water from the first reservoir into the first portion for reverse osmosis to fill the second portion with permeate and wherein the first portion is emptied through the energy recovery device into the second reservoir when electricity is below the first threshold cost; and wherein the electronic controller is programmed to pump water from the second reservoir into the first portion and pump permeate into the second portion to force water through the energy recovery device to generate electricity for a power grid when electricity is above the second threshold cost.

4. The system of claim 1, wherein the energy recovery device is selected from the group comprising a turbine and a pressure exchanger.

5. The system of claim 1, wherein the energy recovery device further comprises a variable flow valve for controlling output flow.

6. The system of claim 1, wherein the pump is operationally connected to a high-frequency drive for controlling the pump frequency of operation.

7. The system of claim 1, wherein the at least one membrane module is a plurality of respective membrane modules.

8. The system of claim 7, wherein the plurality of membrane modules are operationally connected to the pump in a parallel configuration.

9. A method of desalinating water, comprising:
   a) when electricity costs between a first predetermined price and a second predetermined price, fill water is pumped into a reverse osmosis desalination unit to yield desalinated permeate and saltwater having a first salinity;
   b) when electricity costs less than the first predetermined price, fill water is pumped into a reverse osmosis desalination unit to yield desalinated permeate and saltwater having a second salinity; and
   c) when electricity costs greater than the second predetermined price, pure water is flowed into a reverse osmosis desalination unit to yield pressurized saltwater which is run through an energy recovery device to generate electricity;
   wherein the first salinity is lower than the second salinity.

10. The method of claim 9, wherein the energy recovery device is in electric communication with a power grid.

11. The method of claim 9, wherein the reverse osmosis desalination unit further comprises a high-pressure tank having a first chamber and a second chamber and a movable piston wall operationally connected therebetween; wherein the high-pressure tank is operationally connected to receive water to be desalinated in one chamber and pressurized water to be desalinated in the other chamber to force water to be desalinated from the first chamber through the reverse osmosis desalination unit.

12. The method of claim 11, wherein the high-pressure tank further comprises a removable end cap to change the movable piston wall stroke length.

13. The method of claim 11, wherein the high-pressure tank further includes a bypass channel operationally connected thereto to change the high-pressure tank volume.

14. A method of operating a reverse osmosis desalination plant, comprising:
   a) when a first predetermined condition is met, fill water is automatically pumped into at least one reverse osmosis desalination module to yield desalinated permeate and saltwater having a first salinity;
   b) when a second predetermined condition is met, fill water is automatically pumped into the at least one reverse osmosis desalination module to yield desalinated permeate and saltwater having a second salinity; and c) when a third predetermined condition is met, water having a salinity lower than the salinity of the fill water is automatically flowed into the at least one reverse osmosis desalination module to yield pressurized saltwater which is run through an energy recovery device to generate electricity;

wherein the first salinity is lower than the second salinity;

wherein fill water has a salinity lower than the first salinity;

wherein each respective at least one reverse osmosis desalination module further comprises a vessel having a first volume for receiving the fill water, a second volume for containing water having a salinity lower that that of fill water, and an osmotic membrane operationally connected therebetween;

wherein the first predetermined condition is selected from the group comprising electricity rates being between a first predetermined value and a second predetermined value higher than the first predetermined value and when energy availability is between a first predetermined level and a second predetermined level;

wherein the second predetermined condition is selected from the group comprising electricity rates being below the first predetermined value, energy availability being above the second predetermined level, and combinations thereof; and wherein the third predetermined condition is selected from the group comprising electricity rates being above the second predetermined value, energy availability being below the first predetermined level, and combinations thereof.

15. The method of claim 14, wherein when the second predetermined condition is met the pressure in the first volume is increased.

16. The method of claim 14, wherein the at least one reverse osmosis desalination module desalinates water received from a high-pressure tank having a first chamber and a second chamber and a movable piston wall operationally connected therebetween; wherein the high-pressure tank is operationally connected to receive water to be desalinated in the first chamber and pressurized water to be desalinated in the second chamber to force water to be desalinated from the first chamber through the at least one reverse osmosis desalination module.

17. The method of claim 16, wherein the at least one reverse osmosis desalination module is a plurality of reverse osmosis desalination modules connected in parallel to receive water to be desalinated from the high-pressure tank.

18. The method of claim 14, wherein the energy recovery device is selected from the group comprising a turbine and a pressure exchanger.

19. The method of claim 18, wherein an energy recovery ratio is adjusted by changing a flow rate through the energy recovery device.

* * * * *